(12) United States Patent
Verbowski

(10) Patent No.: US 10,882,370 B2
(45) Date of Patent: Jan. 5, 2021

(54) LIFT OPTION KIT

(71) Applicant: Larry Verbowski, Bay City, MI (US)

(72) Inventor: Larry Verbowski, Bay City, MI (US)

( * ) Notice: Subject to any disclaimer, the term of this patent is extended or adjusted under 35 U.S.C. 154(b) by 241 days.

(21) Appl. No.: 15/492,029

(22) Filed: Apr. 20, 2017

(65) Prior Publication Data

US 2018/0304712 A1  Oct. 25, 2018

(51) Int. Cl.
*B60G 13/00* (2006.01)
*B60G 11/16* (2006.01)

(52) U.S. Cl.
CPC ............ *B60G 13/003* (2013.01); *B60G 11/16* (2013.01); *B60G 2204/124* (2013.01); *B60G 2204/128* (2013.01); *B60G 2204/129* (2013.01); *B60G 2204/61* (2013.01); *B60G 2206/911* (2013.01); *B60G 2206/99* (2013.01); *B60G 2500/30* (2013.01)

(58) Field of Classification Search
CPC ....................... B60G 13/003; B60G 2204/128; B60G 7/001; B60G 17/021; B60G 7/02; B60G 2204/61; B60G 2204/143; B60G 2200/144; B60G 2204/1242; B62D 17/00
See application file for complete search history.

(56) References Cited

U.S. PATENT DOCUMENTS

| | | | | |
|---|---|---|---|---|
| RE33,179 E | * | 3/1990 | Pettibone | B60G 3/205 280/86.75 |
| 5,967,536 A | * | 10/1999 | Spivey | B60G 7/001 280/124.141 |
| 6,796,569 B2 | * | 9/2004 | Pankau | B60G 7/008 267/221 |
| 7,144,021 B2 | * | 12/2006 | Carlson | B60G 15/068 280/86.751 |
| 7,537,225 B2 | * | 5/2009 | Ryshavy | B60G 7/003 280/124.147 |
| 7,915,789 B2 | * | 3/2011 | Smith | F21V 14/04 310/324 |
| 8,302,988 B2 | * | 11/2012 | Noble | F16F 1/373 280/124.11 |
| 9,102,207 B2 | * | 8/2015 | Raes | B60G 3/26 |
| 9,211,775 B1 | * | 12/2015 | Ryshavy | B60G 17/021 |
| 9,233,588 B2 | * | 1/2016 | Miller | B60G 7/003 |
| D750,535 S | * | 3/2016 | Ryshavy | D12/159 |
| 2008/0303196 A1 | * | 12/2008 | Lyew | B60G 15/068 267/33 |
| 2013/0180813 A1 | * | 7/2013 | Moore, Jr. | B60G 13/06 188/282.6 |

\* cited by examiner

*Primary Examiner* — Timothy Wilhelm

(57) ABSTRACT

A lift option kit that allows the user to alter the vertical suspension lift of a vehicle.

5 Claims, 5 Drawing Sheets

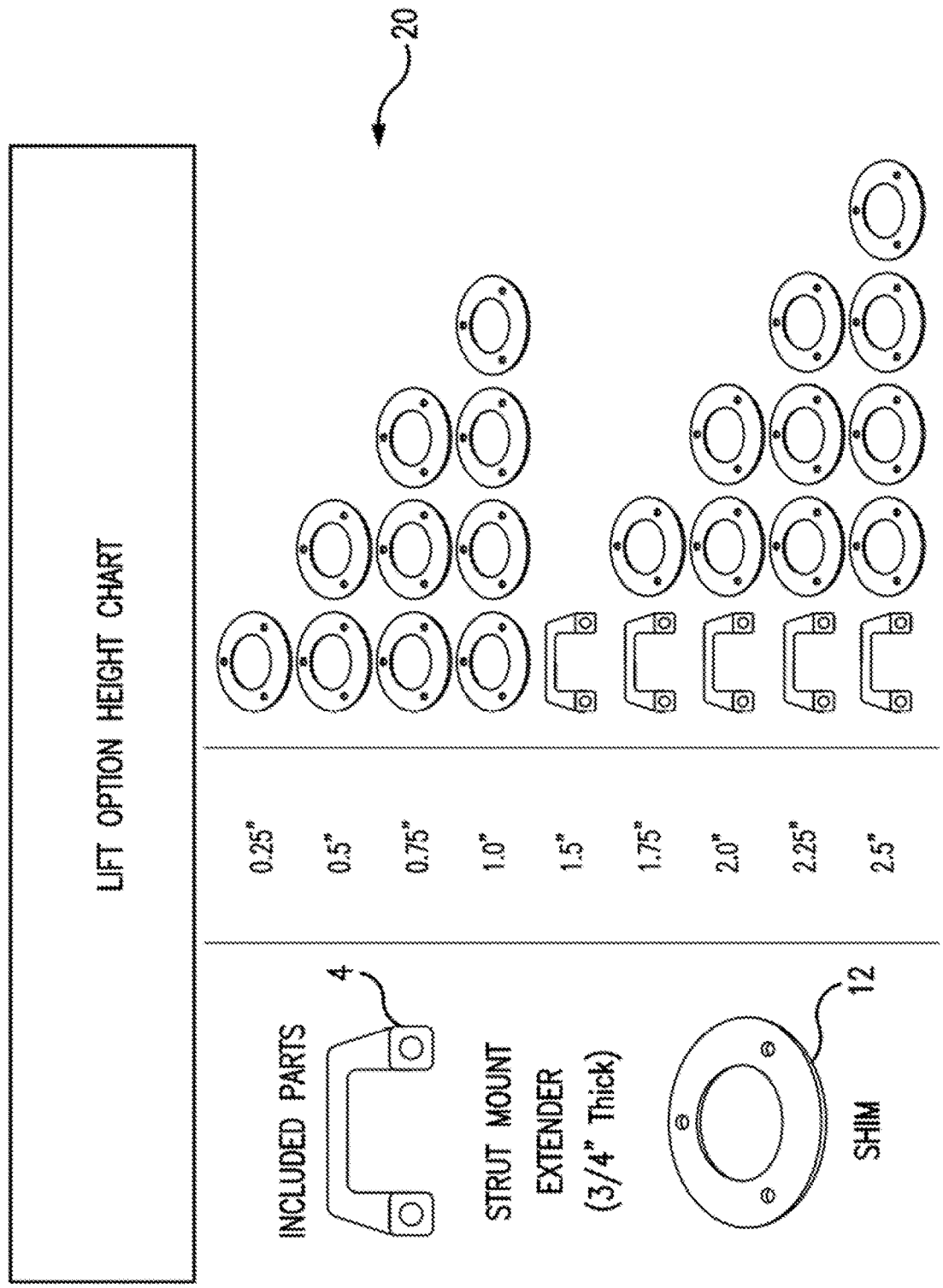

LIFT OPTION KIT

BACKGROUND OF THE INVENTION

The applicant is unaware of any prior art with reference to the present invention.

THE INVENTION

The present invention is a kit for suspension travel and increasing front and ground clearance of a vehicle. The kit comprises at least one strut mount extender and at least one shim. It also incites instructions with regard to using at least one strut mount extender, or at least one shim, or a combination of at least one strut mount extender and at least one shim to provide lift to the vehicle ranging from 0.1 inches to 3.6 inches.

BRIEF DESCRIPTION OF THE DRAWINGS

FIG. 3 is an illustration of a lift option height chart.

DETAILED DESCRIPTION OF THE DRAWINGS

Figure 1:
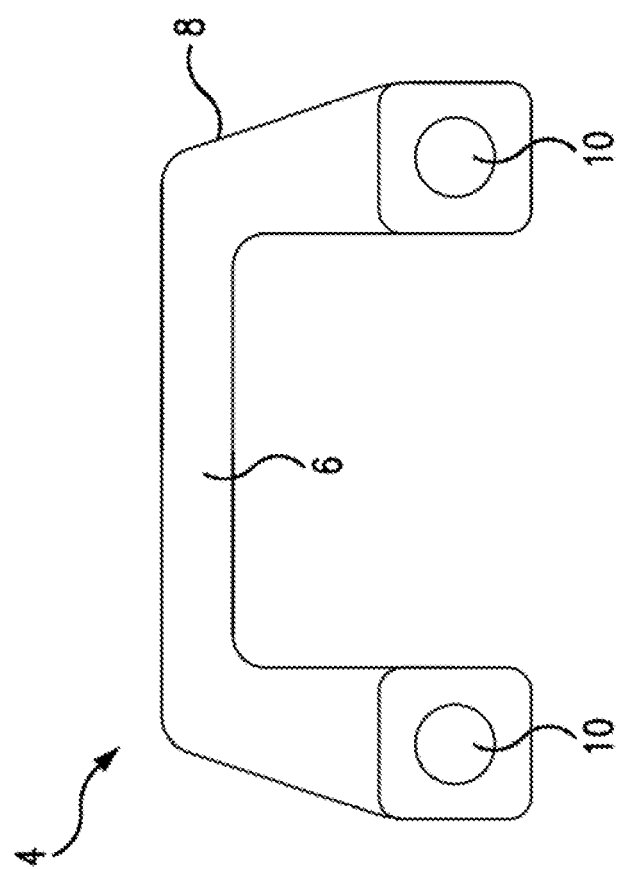
FIG. 1 is a view in perspective of a strut mount extender.

FIG. 1 shows a strut mount extender 4 of the lift option kit 2. The strut mount extender 4 has a front 6 and a back 8. The strut mount extender 4 also has two openings 10 therethrough that allow for attachment.

Figure 2:
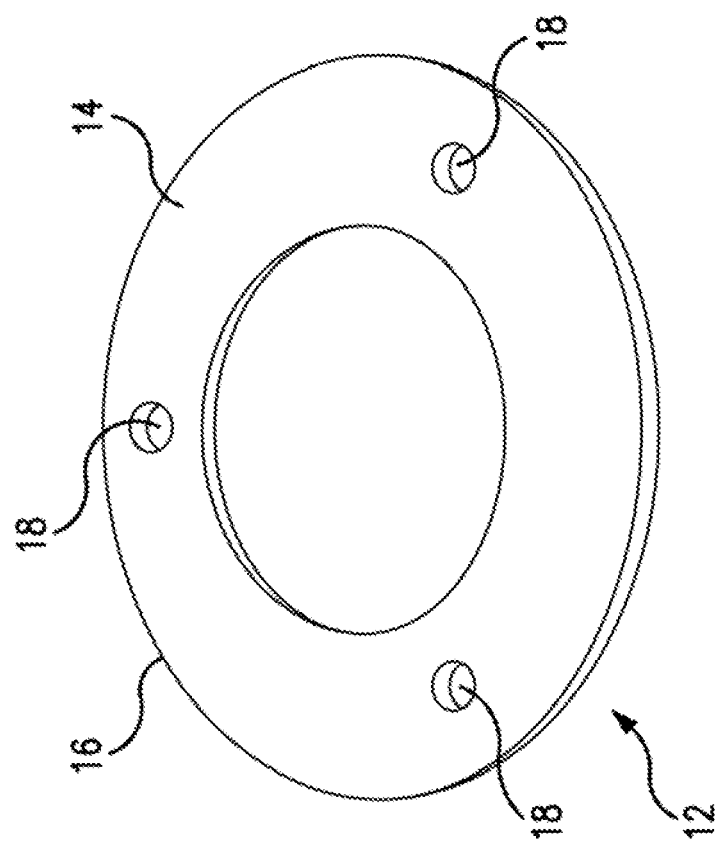
FIG. 2 is a full top view of a shim.

FIG. 2 shows a shim 12. The shim 12 has a top 14 and a bottom 16. The shim 12 also has openings 18 therethrough for attachment.

FIG. 3 shows a lift option height chart 20. This lift option height chart 20 shows the different configurations needed to achieve the desired height of the lift desired by the user. The configuration has two components that make the height adjustment. A shim 12 and the strut mount extender 4. The following description indicates the configuration needed to achieve a certain height. For a lift of a quarter inch one shim 12 is required. For a lift of one half inch, two shims 12 are required. A lift of three quarters inch require three shims 12. For a lift of one inch four shims 12 are required. For a lift of one and a half inches one strut mount extender 4 is required. For a lift of one and three quarters inches one strut mount extender 4 and one shim 12 is required. For lift of two inches one strut mount extender 4 and two shims 12 are required. For a lift of two and a quarter inches one strut mount extender 4 and three shims 12 are required. For a lift of two and a half inches one strut mount extender 4 and four shims 12 are required.

Figure 4:
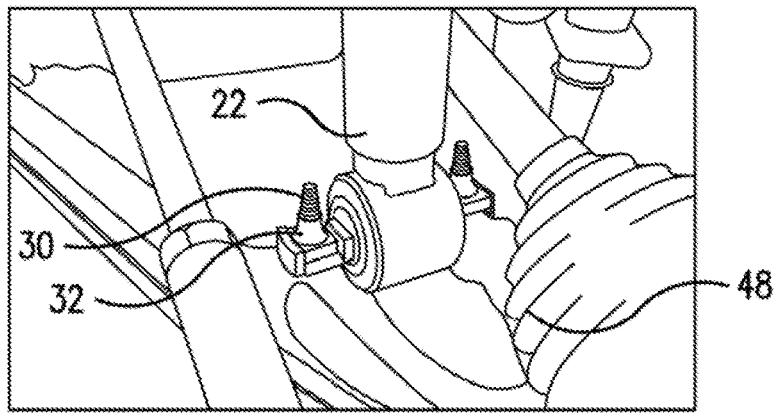
FIG. 4 shows a lower strut.

FIG. 4 shows a lower strut 22. The vehicle is jacked up and supported under the frame with load rated jack stands. The suspension needs to relax fully with the frame support. This installation needs to be performed on both the left and right sides together. The lug and wheel locations are marked and then removed from the front wheels on both sides. The lower strut 22 location that faces outward and is marked. Two lower strut 22 mounting bolts 30 are mounted with a fifteen-millimeter socket. The lower strut 22 is removed by removing the clip nuts 32 with a flat head screw driver or small pry bar. This must be done on both side of the vehicle at this point.

Figure 5:
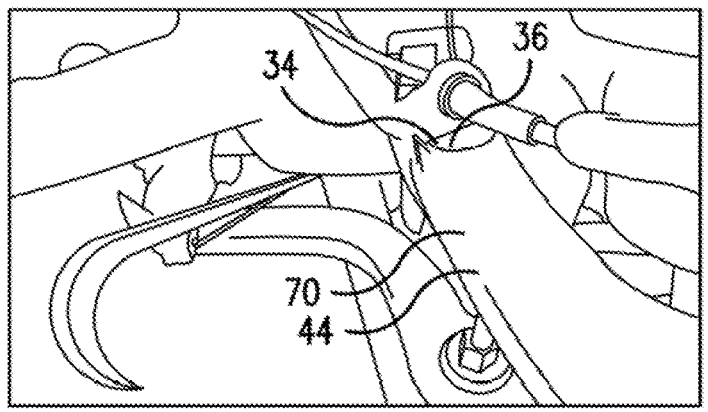
FIG. 5 shows a sway bar.
Figure 8:
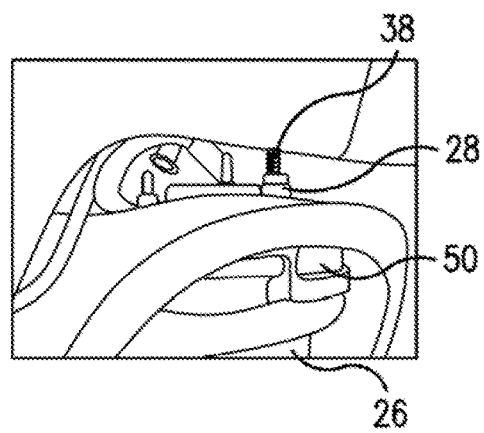
FIG. 8 shows upper strut nuts.
Figure 10:
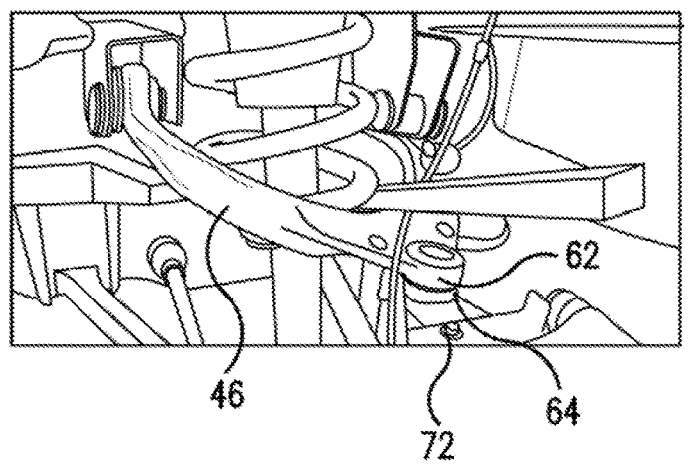
FIG. 10 shows an ABS wire loom clip.

FIG. 5 shows the sway bar. The upper strut frame tower shows wire loom attachment clips 34. One pry's upward on the plastic retainers 36 to free them. An eighteen-millimeter wrench is used to remove the three tail tower nuts 40 in triangle (Shown in FIG. 8). The center strut piston shaft nut is not removed. The lower strut 22 is slid inward off of the lower control arm 44. One should take note of the wire loom attachment clip 34 location. One pries upward on the plastic retainers 36 too tree them from the mounting bolts 30, as they will be need to be reused later (shown in FIG. 8). Holding the lower strut 22 and prying down with a pry bar will lower the control arm 44 allowing for the removal of the lower strut 22. The lower strut 22 assembly is lowered one to two inches. Guide strut 22 assembly is up, and in between, the upper A-arm 46 (FIG. 10). One must be sure to clear the inner CV boot 48 (FIG. 1). The number of shims 12 to be installed are selected and placed on the top of the strut mount 50 (FIG. 8). One then uses the lift option height chart 20 of FIG. 3 to select the desired components for the desired lift.

Figure 6:
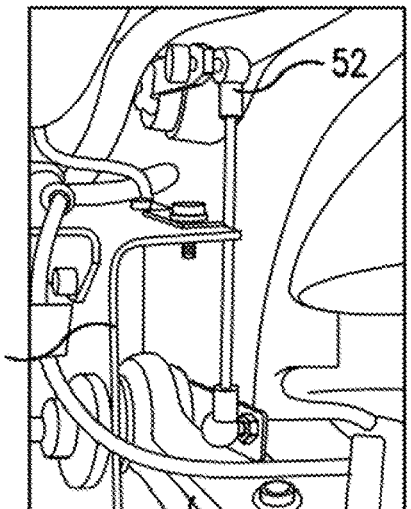
FIG. 6 shows linkage and upper control arm.

FIG. 6 shows linkage 52 and upper control arm 54. Verify if the vehicle has electronic control option. It should be noted that if your vehicle does not include this option continue to FIG. 7. Temporarily disconnect the linkage 52 from the upper control arm bracket 56 with a ten-millimeter open end wrench. Reinstall strut 22 with selected shims 12 installed on the top. Prying down on the sway bar 58 (FIG. 9) is required in the same procedure as above. Hand-tighten three short flange nuts 60 onto threads 38 (FIG. 8) on top strut mount 50 (FIG. 8). These procedures must be performed on both sides of the vehicle before continuing. Also, note for one and three quarters lift to two inch lifts one does not need to disconnect the upper ball joint 62 (FIG. 10) to complete installation. For lifts of two and one quarter to two and a half inches disconnecting the upper ball joint 62 is required.

Figure 7:
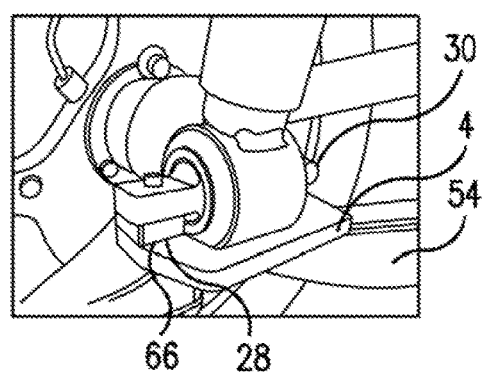
FIG. 7 shows a control arm.

FIG. 7 shows the control arm 54. This step is for lifts of one and three quarter inches to two inches. The procedure is to pry down on the sway bar 58 with a pry bar which will lower the control arm 54 allowing for installation of the strut mount extender 4. Align the mounting holes 10 to install bolts 30, washers 66 and nuts 28. These need to be torqued to thirty-five feet pounds. Next, the three-upper strut 26 mount nuts 28 are torqued to twenty-five foot pounds.

FIG. 8 shows upper strut 26 mount nuts 28. Reinstall wire loom clips 34.

Figure 9:
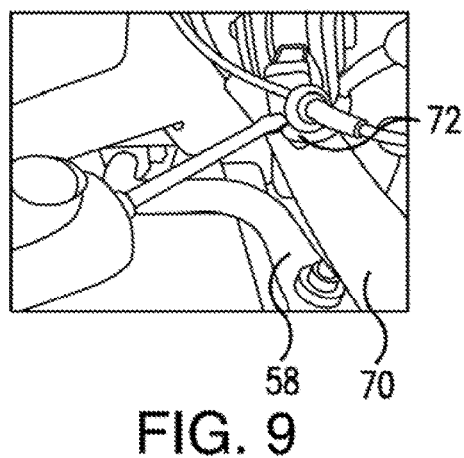
FIG. 9 shows lower A-arm.

FIG. 9 shows lower A-arm 70. This step is the recommended procedure for lifts of two and one quarter inches to two and one half inch lifts. Support the lower A-arm 70 with a bottle lack or foot jack. Unlock the ABS wire loom clip 72, allowing the ABS wire to be free from the clip 72. Remove the ball joint nut with an eighteen-millimeter wrench. It is important that one does not damage the CV boot 40 or ABS cable when lowering.

Support the lower A-arm 70 with a bottle jack or foot jack. Unlock the ABS wire loom clip 72, allowing the ABS wire to be free from the clip 72. Loosen the upper ball joint nut with an eighteen-millimeter wrench, about three to five threads, until an air gap is achieved and the ball joint nut spins freely. Pry down on the suspension, strike the knuckle with a brass hammer to shock the taper 64 and unseat the ball joint 62. Pry down on the sway bar 58 with a pry bar which will lower the control arm 54 allowing for installation of the strut mount extender 4. Extreme caution should be used in this step by closely monitoring the ABS wire and the CV axel clearance to prevent damage. Align the mounting holes 10 and install bolts 30, washers 66 and nuts 28 using thirty-five foot pounds of torque as in FIG. 7. Reconnect the ball joint 62. Apply pressure by pumping the bottle jack under the lower control arm 44. Then raise the lower A-arm 70 with the bottle jack on the outermost point on the control arm 54. At this point caution should be used as jacking under the lower control arm 44 may cause the vehicle to raise off of the jack stands. Next pry downward on the upper control arm 54 realigning the upper ball joint with the knuckle. Then thread on the upper ball joint nut. It is important to note that prying downward on the upper A-arm 46 will seat the taper 64 (FIG. 10) and hold the stud 74 (FIG. 10) from rotating as you tighten the eighteen-millimeter ball joint nut. Some ball joint tapers 64 have an Allen hex to hold the ball joint stud 74 while seating taper 64. Torque to thirty-seven foot pounds plus an additional quarter turn.

FIG. 10 shows the ABS wire loom clip 72. Reinstall the ABS wire into the A-arm clip 72. Torque the upper three strut mount nuts 28 to twenty-five foot pounds. Reinstall the wire loom clips 72. Install the wheels. Perform wheel alignment to the following specification: Camber 0.5 degrees+/--0.5 degrees, Caster 2.0 degrees+/-1.0 degrees, as from left to right must be equal+/-0.25 degrees. Total toe is ⅛ inches+/-⅛ inches.

Figure 11:
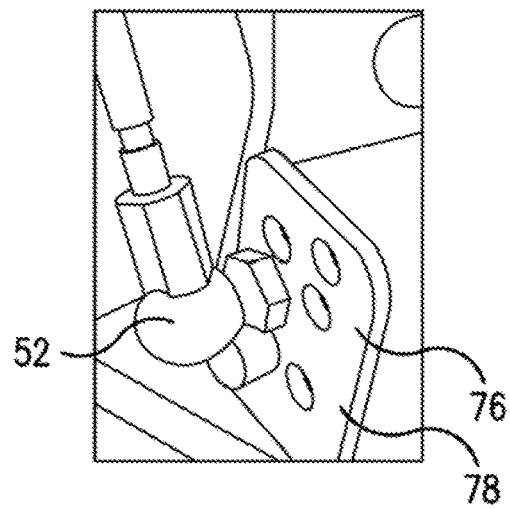
FIG. 11 shows the front of the adjustable relocation bracket.
Figure 12:
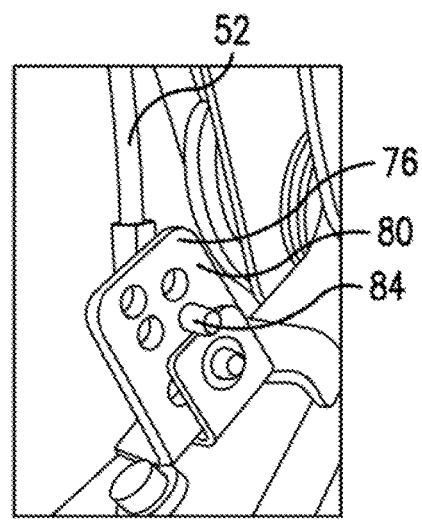
FIG. 12 shows the back of the adjustable relocation bracket.
Figure 13:
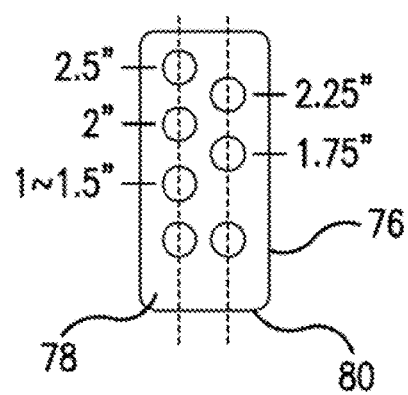
FIG. 13 shows the height adjustment diagram.

FIG. 11 shows the front 78 of the adjustable relocation bracket 76 and FIG. 12 shows the back 80 of the adjustable relocation bracket 76. Bolt on the adjustable relocation bracket 76 with a five millimeter Allen wrench. Reference the chart FIG. 13 for the correct positioning based on the lift of the vehicle. Relocate the linkage arm into the bracket. Both the linkage 52 and the bracket bolt 86 must be kept in line vertically. Use a nut 84 to fasten linkage arm 52. This places the bracket 76 in the correct position for the repositioning of the height sensor to the factory supplied range.

What is claimed is:

1. Kit for suspension travel and increasing front and ground clearance of a vehicle, said kit comprising:
   (i.) at least one strut mount extender;
   (ii.) at least one shim,
   (iii.) an adjustable relocation bracket and,
   (iv.) instructions with regard to using said at least one strut mount extender, or said at least one shim, or a combination of at least one strut mount extender and said at least one shim, to provide lift to said vehicle ranging from 0.1 inches to 3.6 inches.

2. The kit for suspension travel as claimed in claim 1 wherein the strut mount extender has two openings that allow for attachment.

3. The kit for suspension travel as claimed in claim 1 where there is at least two shims.

4. The kit for suspension travel as claimed in claim 1 where there is at least three shims.

5. The kit for suspension travel as claims in claim 1 where there is 4 shims.

\* \* \* \* \*